(12) United States Patent
Zhou

(10) Patent No.: US 8,599,549 B2
(45) Date of Patent: Dec. 3, 2013

(54) MOUNTING APPARATUS FOR BACKPLANE

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 181 days.

(21) Appl. No.: 13/329,236

(22) Filed: Dec. 17, 2011

(65) Prior Publication Data

US 2013/0135815 A1 May 30, 2013

(30) Foreign Application Priority Data

Nov. 30, 2011 (CN) .......................... 2011 1 0389407

(51) Int. Cl.
 *G06F 1/16* (2006.01)
 *H05K 5/00* (2006.01)
 *H05K 7/00* (2006.01)

(52) U.S. Cl.
 USPC ............. 361/679.37; 361/679.33; 248/220.21

(58) Field of Classification Search
 None
 See application file for complete search history.

(56) References Cited

U.S. PATENT DOCUMENTS

| 5,914,855 | A | * | 6/1999 | Gustafson et al. | ....... 361/679.34 |
| 6,061,244 | A | * | 5/2000 | O'Sullivan et al. | ........... 361/727 |
| 7,440,271 | B2 | * | 10/2008 | Chen et al. | .............. 361/679.33 |
| 7,848,099 | B1 | * | 12/2010 | Zhang et al. | ............. 361/679.38 |
| 8,118,270 | B2 | * | 2/2012 | Hsieh et al. | .............. 248/220.21 |
| 2006/0002077 | A1 | * | 1/2006 | Carlson et al. | ................ 361/685 |
| 2006/0250766 | A1 | * | 11/2006 | Blaalid et al. | ................ 361/685 |
| 2009/0103258 | A1 | * | 4/2009 | Signer et al. | ............. 361/679.33 |
| 2010/0079936 | A1 | * | 4/2010 | Bridges et al. | ........... 361/679.02 |
| 2010/0142159 | A1 | * | 6/2010 | Lee et al. | ....................... 361/747 |
| 2010/0194256 | A1 | * | 8/2010 | Grabherr | ..................... 312/319.1 |
| 2010/0265650 | A1 | * | 10/2010 | Chen et al. | .............. 361/679.33 |
| 2010/0327135 | A1 | * | 12/2010 | Selvidge et al. | ......... 248/221.11 |
| 2010/0328905 | A1 | * | 12/2010 | Chang et al. | ................. 361/752 |

* cited by examiner

*Primary Examiner* — Jinhee Lee
*Assistant Examiner* — Xanthia C Cunningham
(74) *Attorney, Agent, or Firm* — Altis & Wispro Law Group, Inc.

(57) ABSTRACT

A mounting apparatus for mounting a hard disk drive backplane to a side of a bracket in a chassis includes a first mounting member, a second mounting member, a pivot member, and a locking member. The bottom and opposite ends of the backplane are clipped to the bracket. The second mounting member is fixed to a top side of the backplane and is locked to a top plate of the bracket. The first mounting member is fixed to a bottom side of the backplane. The first mounting member includes an engaging portion. The locking portion is fixed to the chassis. A first end of the pivot member is pivotably mounted to the chassis. A second end of the pivot member is locked to the locking member. A pressing portion extends down from a middle of the pivot member to press the engaging portion on the chassis.

16 Claims, 5 Drawing Sheets

MOUNTING APPARATUS FOR BACKPLANE

BACKGROUND

1. Technical Field

The present disclosure relates to an apparatus for mounting a backplane.

2. Description of Related Art

An electronic device, such as a server, is generally equipped with a plurality of hard disk drives (HDD). The HDDs are connected to a backplane for connection to a motherboard. If the backplane is not stably fixed to an HDD bracket, the backplane will easily loosen when hot-plugging the HDDs.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
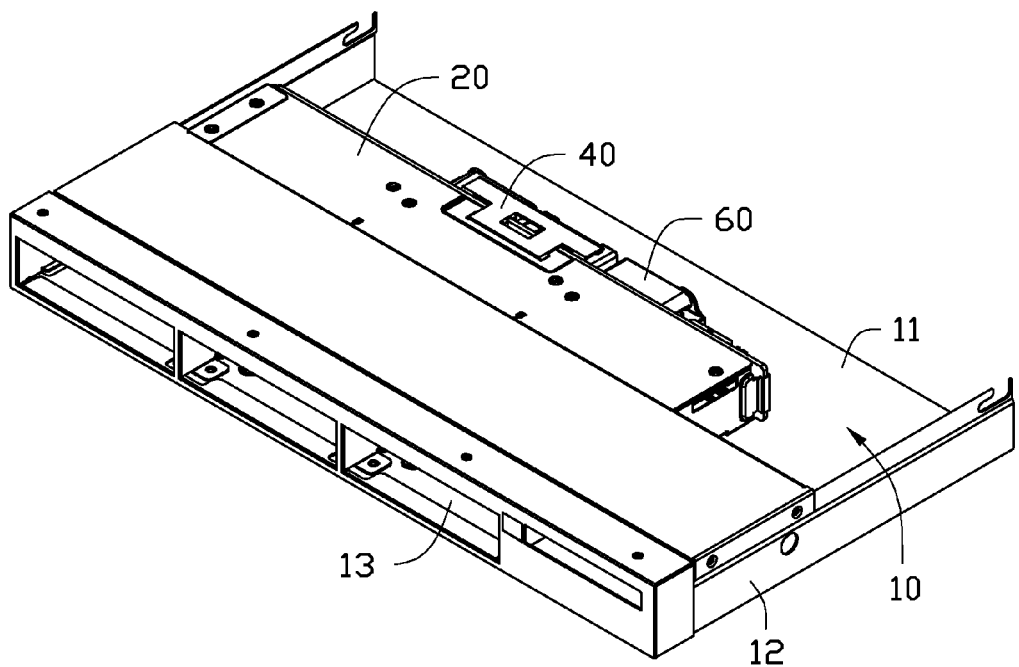
FIG. 1 is an assembled, isometric view of an exemplary embodiment of a mounting apparatus and a backplane.
Figure 2:
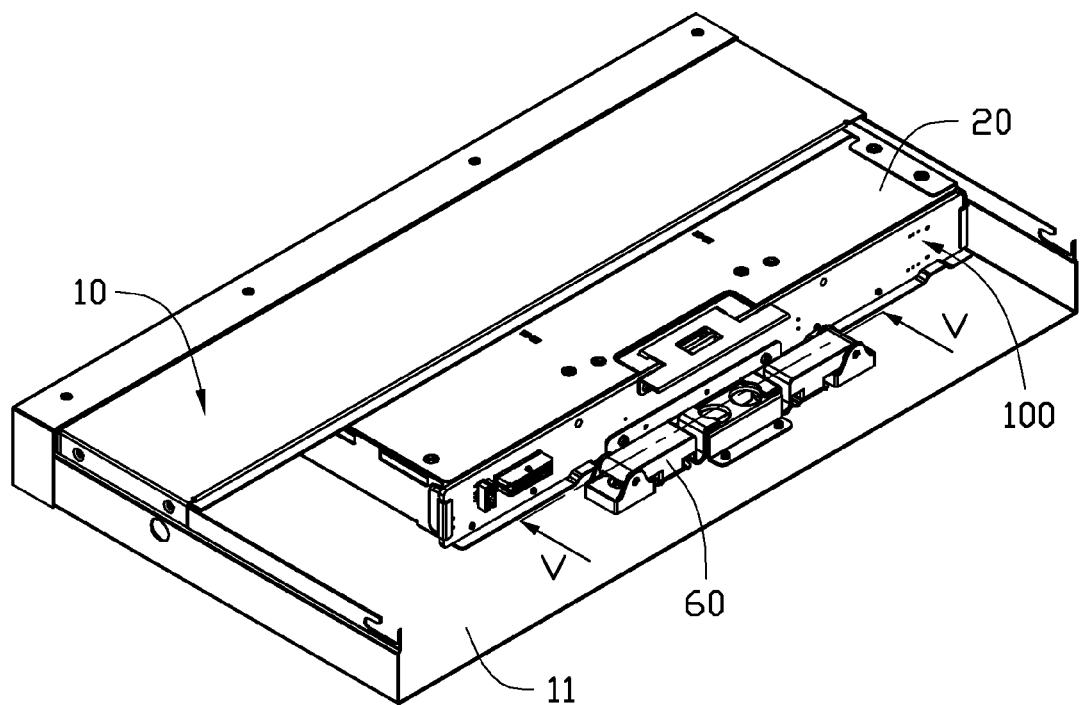
FIG. 2 is similar to FIG. 1, but viewed from another aspect.
Figure 3:
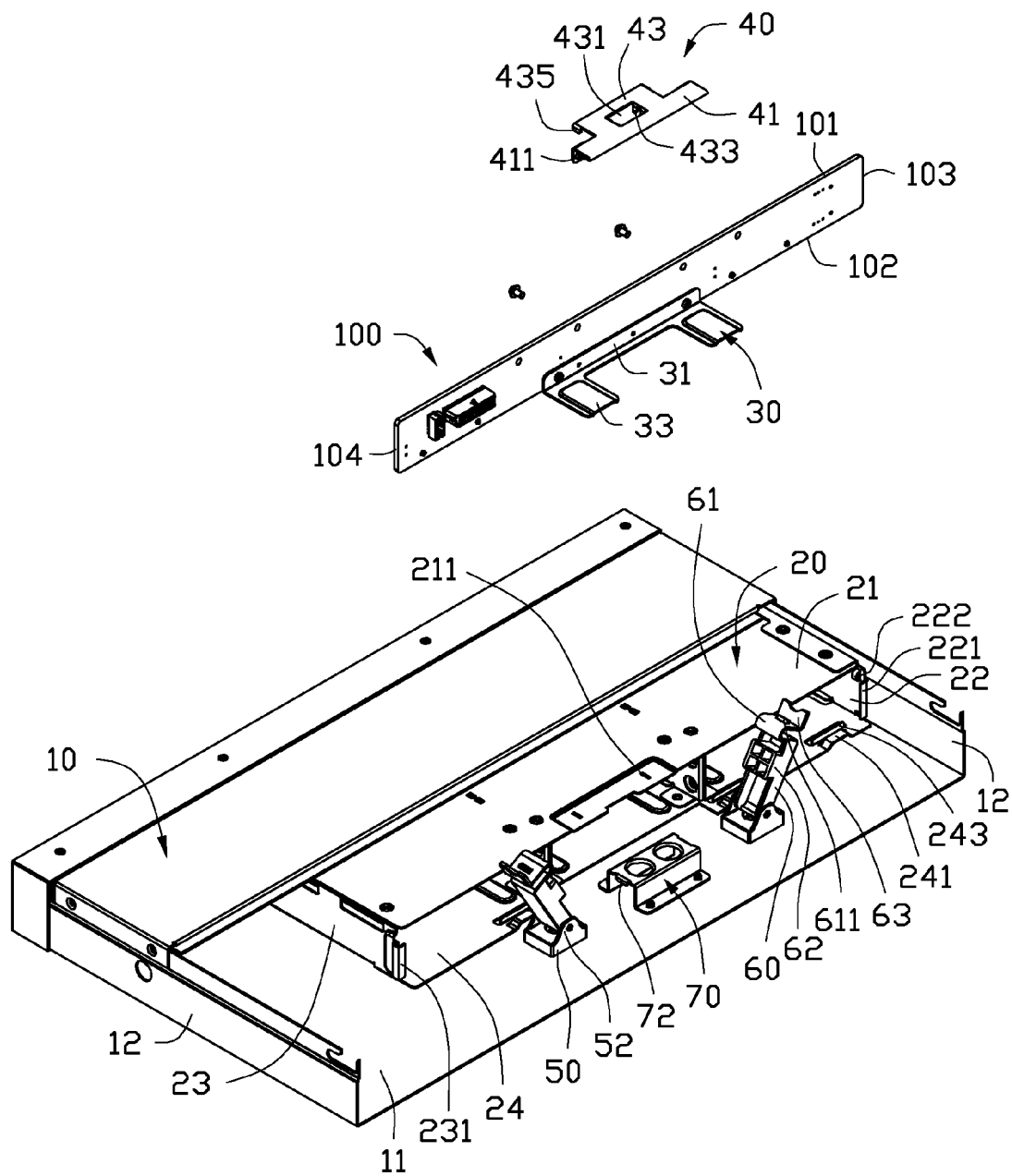
FIG. 3 is an exploded, isometric view of FIG. 2.

FIG. 1 to FIG. 3, an exemplary embodiment of a mounting apparatus is provided for mounting a hard disk drive (HDD) backplane 100 in a chassis 10 of an electronic device. The backplane 100 connects a plurality of HDDs (not shown). The mounting apparatus includes an HDD bracket 20 for holding the HDDs, a first mounting member 30, a second mounting member 40, two connecting members 50, two pivot members 60, and a locking member 70.

The backplane 100 is substantially bar-shaped, and includes a top side 101, a bottom side 102 opposite to the top side 101, a first end 103, and a second end 104 opposite to the first end 103.

The chassis 10 includes a bottom wall 11, and two end walls 12 perpendicularly extending from opposite ends of the bottom wall 11. A plurality of openings 13 is defined in a first side of the chassis 10, through which the HDDs extends.

The bracket 20 is arranged on the bottom wall 11 and aligns with the openings 13. The bracket 20 includes a top plate 21, a first end plate 22, a second end plate 23, and a bottom plate 24. Two locking slots 211 are defined in the top plate 21 away from the openings 13. The first end plate 22 is attached to one of the end walls 12. A flange 221 extends perpendicularly from an end of the first end plate 22 opposite to the openings 13. Two raised portions 222 protrude from an inner surface of the first end plate 22, adjacent to the flange 221. A U-shaped clipping portion 231 is formed from an end of the second end plate 23 opposite to the openings 13. A plurality of tabs 241 and a plurality of mounting pieces 243 near the corresponding tabs 241 protrude from the bottom plate 24.

The first mounting member 30 includes a fixing portion 31 fixed to the bottom side 102, and two engaging portions 33 perpendicularly extending from opposite ends of a bottom of the fixing portion 31.

The second mounting member 40 includes a plate shaped main body 43. Two mounting portions 41 extend out from opposite ends of a first side of the main body 43. A mounting piece 411 extends down from each mounting portion 41. The second mounting member 40 is fixed to the top side 101 with the mounting pieces 411. A rectangular hole 431 is defined in a center of the main body 43. Two pairs of fingers 433 respectively extend down from two opposite inner walls bounding the hole 431. Each pair of fingers 433 clips to the top side of the backplane 100. Two locking pieces 435 extend down from opposite ends of a second side of the main body 43 opposite to the mounting portions 41.

The connecting members 50 are fixed on the bottom wall 11. Each connecting member 50 includes two parallel connecting pieces 52 each defining a pivot hole (not labeled).

Each pivot member 60 includes a first end pivotably connected to a corresponding connecting member 50 through a shaft extending through the pivot holes of the connecting pieces 52 and the first end of the pivot member 60, and a second end opposite to the first end. A substantially U-shaped resilient latching portion 61 is formed from the second end of the pivot member 60. A wedge 611 protrudes from an outer surface of the latching portion 61 opposite to the first end of the pivot member 60. A handle 63 is formed from a distal end of each latching portion 61. A pressing portion 62 extends down from a middle of each pivot member 60.

The locking member 70 is fixed on the bottom wall 11 between the connecting members 50. Two blocks 72 respectively extend down from opposite ends of the locking member 70.

Figure 4:
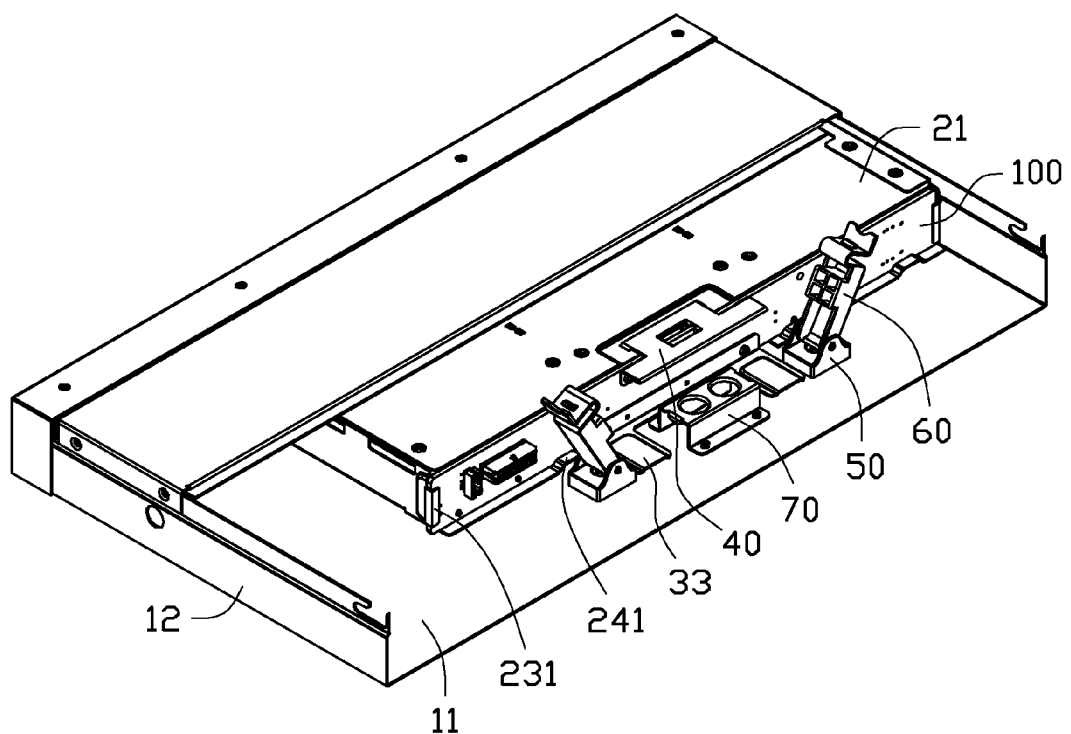
FIG. 4 is similar to FIG. 2, but shows another state of use.
Figure 5:
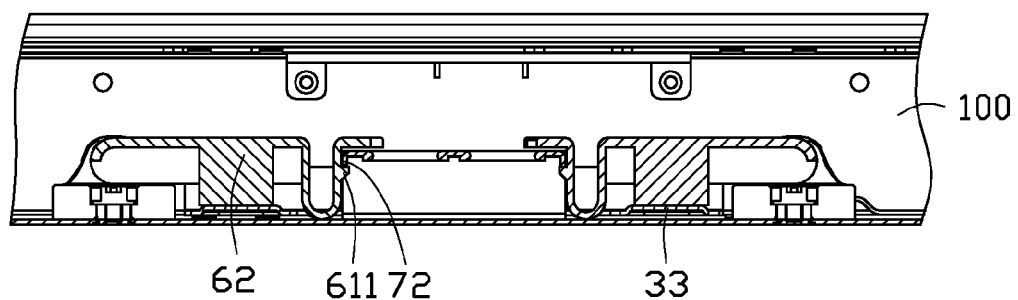
FIG. 5 is a partially cross-sectional view of FIG. 2, taken along the line of V-V.

Referring to FIG. 4 and FIG. 5, in assembly, the backplane 100 is supported on the bottom plate 24 and arranged at a side of the bracket 20 opposite to the openings 13. The bottom side 102 is clipped between the tabs 241 and the mounting pieces 243. The first end 103 is clipped between the raised portions 222 and the flange 221. The clipping portion 231 clips the second end 104. The locking pieces 435 are locked to the corresponding locking slots 211. The engaging portions 33 are supported on the bottom wall 11, and each engaging portion 33 is set between the corresponding connecting member 50 and the locking member 70. The pivot members 60 are pivoted toward each other, until the wedges 611 are locked to the corresponding blocks 72. The pressing portions 62 abut against the corresponding engaging portions 33 on the bottom wall 11.

When releasing the backplane 100, the handles 63 are operated to release the wedges 611 from the blocks 72. The pivot members 60 are then rotated away from each other to release the first mounting member 30. Therefore, the backplane 100 can be removed.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A mounting apparatus for mounting a hard disk drive backplane in a chassis, comprising:
   a hard disk drive bracket comprising a top plate, a first end plate, a second end plate, and a bottom plate mounted on the chassis, wherein a locking slot is defined in a rear side of the top plate, a flange extends perpendicularly from a rear end of the first end plate, two raised portions protrude from an inner surface of the rear end of the first end plate adjacent to the flange, a clipping portion is formed from a rear end of the second end plate, a plurality of tabs and a plurality of mounting pieces respectively near the tabs protrude from a rear side of the bottom plate;
   a first mounting member fixed to a bottom side of the backplane, wherein an engaging portion extends from a bottom of the first mounting member;
   a second mounting member fixed to a top side of the backplane, wherein a locking piece extends down from a front side of the second mounting member;
   a locking member fixed to the chassis; and
   a pivot member with a first end pivotably connected to the chassis, wherein a pressing portion extends down from a middle of the pivot member;
   wherein the backplane is arranged on the chassis and set at a rear side of the bracket, the bottom side of the backplane is clipped between the tabs and the mounting pieces, a first end of the backplane is clipped between the raised portions and the flange, a second end of the backplane is clipped by the clipping portion, the locking piece is locked to the locking slot, the pivot member is pivoted down until a second end of the pivot member, away from the first end of the pivot member, is locked to the locking member such that the pressing portion presses the engaging portion on the chassis.

2. The mounting apparatus of claim 1, wherein the clipping portion is substantially U-shaped.

3. The mounting apparatus of claim 1, wherein the second mounting member comprises a plate shaped main body, two mounting portions extend out from opposite ends of a rear side of the main body, a mounting piece extends down from each of the mounting portions and is fixed to the backplane.

4. The mounting apparatus of claim 3, wherein a hole is defined in a center of the main body, two pairs of fingers respectively extend down from opposite inner walls bounding the hole, each pair of fingers clip the top side of the backplane.

5. The mounting apparatus of claim 1, wherein the locking member comprises a block facing the pivot member, a substantially U-shaped latching portion is formed from the second end of the pivot member, a wedge protrudes from an outer surface of the latching portion, to be locked to the block.

6. The mounting apparatus of claim 5, wherein a handle is formed from a distal end of the latching portion.

7. A mounting apparatus for mounting a backplane in a chassis, comprising:
   a bracket comprising a bottom plate mounted to the chassis, a top plate opposite to the bottom plate, and a first end plate and a second end plate connected between corresponding ends of the bottom plate and the top plate;
   a first mounting member fixed to a bottom side of the backplane, wherein an engaging portion extends from a bottom of the first mounting member;
   a locking member fixed to the chassis; and
   a pivot member with a first end pivotably connected to the chassis, wherein a pressing portion extends down from a middle of the pivot member;
   wherein the backplane is arranged on the chassis and set at a rear side of the bracket, opposite ends of the backplane are positioned to the corresponding first and second ends plates of the bracket, the pivot member is operable to be pivoted down until a second end of the pivot member is locked to the locking member such that the pressing portion presses the engaging portion on the chassis.

8. The mounting apparatus of claim 7, wherein the locking member comprises a block facing the pivot member, a substantially U-shaped latching portion is formed from the second end of the pivot member, a wedge protrudes from an outer surface of the latching portion, to be locked to the block.

9. The mounting apparatus of claim 8, wherein a handle is formed from a distal end of the latching portion.

10. An electronic device, comprising:
    a chassis comprising a bottom wall and two end walls perpendicularly extending from opposite ends of the bottom wall;
    a hard disk drive bracket comprising a bottom plate fixed to the bottom wall, a top plate opposite to the bottom plate, a first end plate connected between first ends of the bottom plate and the top plate, and a second end plate connected between second ends of the bottom plate and the top plate, wherein a locking slot is defined in a rear side of the top plate, a flange extends perpendicularly from a rear end of the first end plate, two raised portions protrude on the rear end of the first end plate adjacent to the flange, a clipping portion is formed from a rear end of the second end plate, a plurality of tabs and a plurality of mounting pieces respectively near the tabs protrude on a rear side of the bottom plate;
    a hard disk drive backplane arranged at a rear side of the bracket, the backplane comprising a top side, a bottom side, a first end, and a second end;
    a first mounting member fixed to the bottom side of the backplane, wherein an engaging portion extends from a bottom of the first mounting member;
    a second mounting member fixed to the top side of the backplane, wherein a locking piece extends down from a front side of the second mounting member;
    a locking member fixed to the bottom wall of the chassis; and
    a pivot member with a first end pivotably connected to the chassis, wherein a pressing portion extends down from a middle of the pivot member;
    wherein the bottom side of the backplane is clipped between the tabs and the mounting pieces, the first end is clipped between the raised portions and the flange, the second end is clipped by the clipping portion, the locking piece is locked to the locking slot, the pivot member is pivoted down until a second end of the pivot member is locked to the locking member such that the pressing portion presses the engaging portion on the chassis.

11. The electronic device of claim 10, wherein the clipping portion is substantially U-shaped.

12. The electronic device of claim 10, wherein the second mounting member comprises a plate shaped main body, two mounting portions extend out from opposite ends of a rear side of the main body, a mounting piece extends down from each of the mounting portions and is fixed to the backplane.

13. The electronic device of claim 12, wherein a rectangular hole is defined in a center of the main body, two pairs of fingers respectively extend down from opposite inner walls bounding the hole, each pair of fingers clip the top side of the backplane.

14. The electronic device of claim 10, wherein the locking member comprises a block facing the pivot member, a substantially U-shaped latching portion is formed from the second end of the pivot member, a wedge protrudes on an outer surface of the latching portion, to be locked to the block.

15. The electronic device of claim 14, wherein a handle is formed from a distal end of the latching portion.

16. The electronic device of claim 14, wherein a connecting member is fixed to the bottom wall of the chassis, the pivot member is pivotably mounted to the connecting member.

\* \* \* \* \*